United States Patent [19]

Papasideris

[11] 4,160,916

[45] Jul. 10, 1979

[54] ENGINE STOP-START ELECTRICAL CIRCUIT

[75] Inventor: Stamos I. Papasideris, Bristol, Ill.

[73] Assignee: Caterpillar Tractor Co., Peoria, Ill.

[21] Appl. No.: 832,252

[22] Filed: Sep. 12, 1977

[51] Int. Cl.[2] .............................................. H02G 3/00

[52] U.S. Cl. ........................ 307/10 R; 123/DIG. 11; 123/198 D

[58] Field of Search ............... 307/10 R, 328; 322/10, 322/11, 7, 8, 62; 290/36 R, 37 R, 38 R, 40 R; 123/198 D, DIG. 11

[56] References Cited

U.S. PATENT DOCUMENTS

| | | | |
|---|---|---|---|
| 3,398,731 | 8/1968 | Johansson | 123/198 D |
| 3,781,651 | 12/1973 | Heidel | 307/10 R |

*Primary Examiner*—J. V. Truhe
*Assistant Examiner*—Morris Ginsburg
*Attorney, Agent, or Firm*—Phillips, Moore, Weissenberger, Lempio & Majestic

[57] ABSTRACT

An electrical circuit for use with an engine having an alternator has a relay to control a solenoid to properly shut down a diesel engine and includes openable and closable contacts for supplying power to another portion of the circuit, it being ensured that such contacts remain closed when either the vehicle key is in the on position or there exists an alternator output.

9 Claims, 1 Drawing Figure

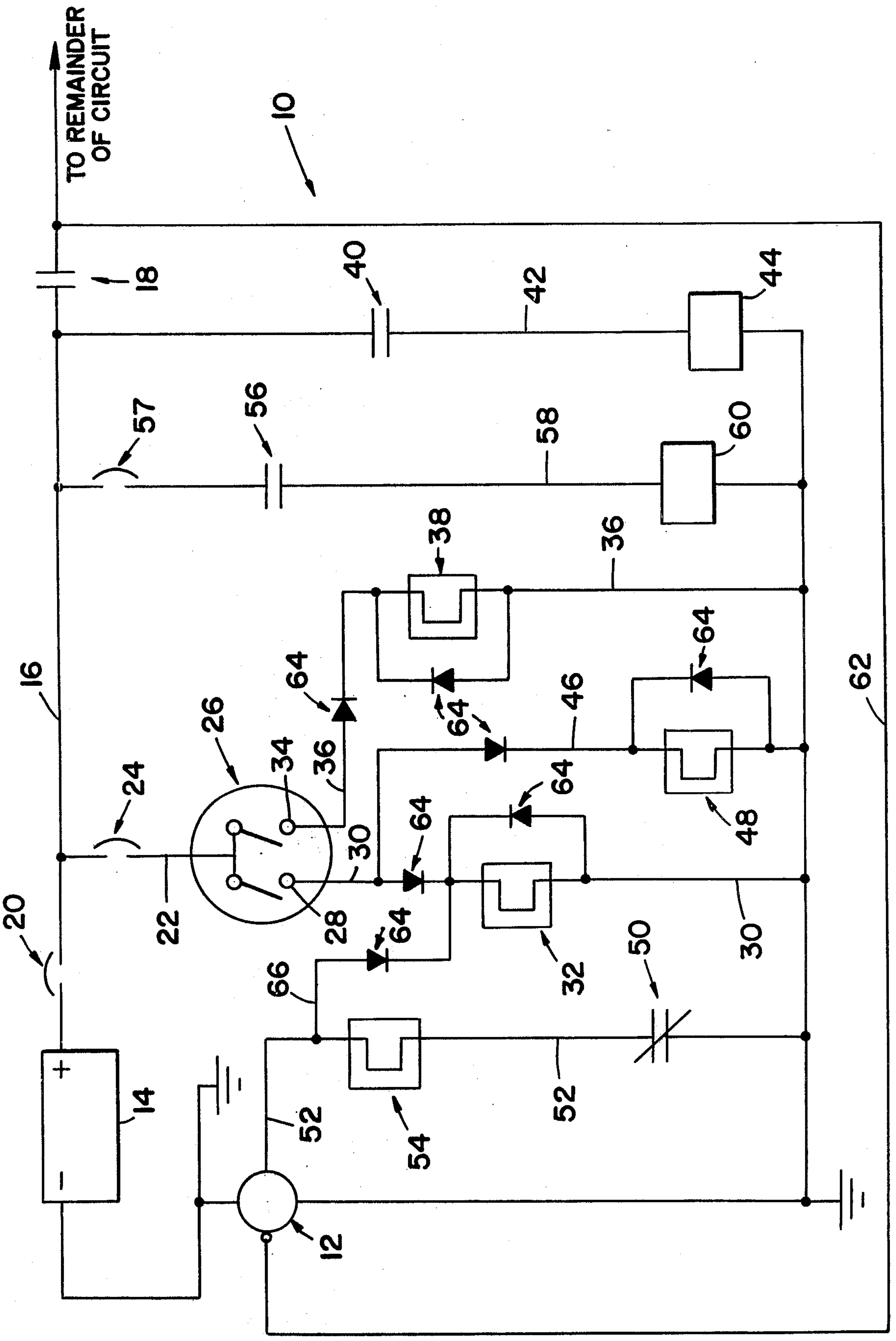
TO REMAINDER
OF CIRCUIT

ENGINE STOP-START ELECTRICAL CIRCUIT

BACKGROUND OF THE INVENTION

This invention relates to electrical circuitry, and more particularly, to electrical circuitry for a vehicle including an engine.

In a vehicle including, for example, an internal combustion engine, such a vehicle generally includes electrical current generating means in the form of an alternator (or generator). The operator of the vehicle uses a key to operate a starter solenoid to start the engine, such key also being used to shut down the engine.

In the shut down of a diesel engine, the switch associated with the key shuts down the engine through interaction with the engine governor. In such prior systems, the deactivation of a shut-off solenoid in the circuit provides shut down of the engine through the governor. In such a system, the shut-off solenoid remains activated during the entire time that the engine is running.

In certain types of circuits, the key operates a switch which, upon closing, closes a set of contacts to provide power from a battery to the remaining portion of the circuit. In such a typical circuit, the opening of the switch by turning of the key opens such contacts. At the time of the opening of such contacts, it will be understood that the engine and the alternator are still turning, so that the alternator continues to produce electric current. This causes a surge of current to pass through the system, with the possible result that some of the components of the system, i.e., for example, light bulbs, are rendered inoperable.

SUMMARY OF THE INVENTION

It is the object of this invention to overcome one or more of the problems as set forth above.

In accordance with the present invention, there is provided an electrical circuit for use with an engine. The circuit comprises an electrical power source, and openable and closable contact means. Further included are engine shut-off solenoid means operable to shut down the engine upon actuation thereof. Means operatively connect the contact means and engine shut-off solenoid means for providing that with the contact means initially opened, the shut-off solenoid means is activated.

BRIEF DESCRIPTION OF THE DRAWING

Other objects of the invention will become apparent from a study of the following specification and drawing, which is a schematic representation of the circuit of the present invention.

DESCRIPTION OF THE PREFERRED EMBODIMENT

Referring to the drawing, the overall electrical circuit 10 which is the subject of this invention is shown. The circuit 10 is for use with an engine having electrical current generating means in the form of an alternator 12, rotation of the crank shaft of the engine rotating such alternator to provide an alternator output. The circuit includes a battery 14, and a line 16 extends from the positive terminal of the battery to the remainder of the circuit, the line 16 having therein contact means 18 in the form of normally open contacts, and a circuit breaker 20. A line 22 communicates with line 16, such line including a circuit breaker 24, and leading to contact means in the form of a key-operated switch 26. A terminal 28 of switch 26 has a line 30 extending therefrom to ground, and includes a relay 32. Such relay 32 is operatively connected with the contacts 18 so that energizing of the relay 32 by application of electric current therethrough closes the normally open contacts 18, and de-energizing of such relay 32 provides opening of the contacts 18. The other terminal 34 of the switch 26 has leading therefrom another line 36, leading to ground, such line 36 including a relay 38. Such relay 38 is operatively connected with normally open contacts 40 placed in a line 42 communicating with line 16 and with ground, an engine starter solenoid 44 also being included in such line 42. Energizing of the relay 38 by application of electric current therethrough closes the normally open contacts 40, and de-energizing of such relay 38 provides opening of the contacts 40.

A line 46 is in parallel with line 30 and includes a relay 48. The relay 48 is in operative association with normally closed contacts 50 placed in a line 52 leading from one terminal of the alternator 12 to ground. Energizing of the relay 48 will provide opening of the contacts 50 and de-energizing of the relay 48 will provide closing of the contacts 50. The line 52 also includes another relay 54 in operative association with normally open contacts 56 placed in another line 58 communicating with line 16 through a breaker 57 and extending to ground. Energizing of the relay 54 provides closing of the contacts 56, and de-energizing of the relay 54 provides opening of the contacts 56. The line 58 also includes an engine shut-off solenoid 60.

The output side of the alternator 12 communicates with the line 16 beyond the contacts 18 by means of a line 62.

A number of diodes 64 are in the circuit to ensure proper direction of current therewithin as necessary.

In operation, with the engine, for example, at rest, and with the key off, the circuit elements are in the states shown in the drawing. Turning of the key to the on position by the operator of the vehicle first provides current from the battery 14 to terminal 28, of the switch 26. Thus, power is supplied to energize the relay 32, closing the contacts 18 to provide power to the remainder of the circuit. At the same time, power is supplied to the relay 48 so that the contacts 50 are opened to prevent energization of relay 54. Further turning of the key of switch 26 will provide current to terminal 34 and energize relay 38. Such action will close contacts 40 and thus energize the starter solenoid 44 to start the engine. Once the engine is started, the key is released so that only terminal 28 will be energized. As a result, relay 38 is de-energized, contacts 40 are opened and starter solenoid 44 is de-activated.

When engine shut-down is required, the key operated switch 26 is moved to the position shown in the drawing, so that relay 48 is de-energized, and contacts 50 are closed. With the engine still turning, the alternator continues to provide an output in line 52. Thus, relay 54 is energized, in turn closing contacts 56, to in turn energize the shut-off solenoid 60. upon initial shut-down of the engine, but before the engine has achieved a full shut-down state, the alternator 12 continues to turn so that an output continues to exist in the line 52. Thus, continued activation of the shut-off solenoid is assured until the engine completely stops. Also, because of the communication of line 52 with line 30 to a connecting line 66, the relay 32 is still being energized to keep the contacts 18 closed, eliminating any of the problems of surge discussed above. Thus, as long as the switch 26 is closed or the alternator 12 is providing an output, the relay 32 is energized, keeping the contacts 18 closed.

The shut-off solenoid 60 thus shuts down the engine upon activation thereof. It will be seen that upon opening of the switch 26, the shut-off solenoid 60 is activated and remains so until such time as the engine (and alternator driven thereby) completely stops. Solenoid 60 is activated against an internalspring force, and will automatically return to the de-activated state until such time as the cycle is repeated. It will thus be seen that contrary to prior systems, the shut-off solenoid 60 is de-activated while the engine is running, and is activated only during the time when the switch 26 is open and the engine comes to a complete stop because of the sequential action of closing contacts 50, energizing relay 54, and closing contacts 56.

The embodiments of the invention is which an exclusive privilege or property is claimed are defined as follows:

1. An electrical circuit for controlling an engine, comprising:
(a) electrical power source means for starting and turning off the engine;
(b) an engine shut-off solenoid being energizable only after turning off the engine; and
(c) means for generating current on start-up of the engine and after turning off the engine and for energizing said shut-off solenoid with said current that is generated after the turning off the engine.

2. An electrical circuit according to claim 1, wherein said generating means is electrically coupled to said power source means during shut-off of the engine.

3. An electrical circuit according to claim 1, wherein said means for generating includes:
(a) first relay means for controlling the closing of a path to said shut-off solenoid in response to engine turn-off; and
(b) second relay means for closing the path to said shut-off solenoid in response to the current being generated after engine turn-off.

4. An electrical circuit according to claim 3, wherein said second relay means includes:
(a) a first relay having contacts; and
(b) a second relay having contacts.

5. An electrical circuit for controlling an engine, comprising:
(a) electrical power source means for starting and turning off the engine;
(b) means for generating current on start-up of the engine and after turning off the engine;
(c) energizable means for shutting off the engine;
(d) first relay means for controlling the closing of a path from said current generating means to said energizable means and said power source means in response to turning off the engine; and
(e) second relay means for closing the path from said current generating means to said energizable means and said power source means in response to the current being generated after turning off the engine.

6. An electrical circuit according to claim 5, wherein said second relay means includes:
(a) a first relay having contacts and being connected to said current generating means; and
(b) a second relay having contacts and being connected to said current generating means.

7. An electrical circuit according to claim 6, wherein said first relay means includes a third relay having contacts, said third relay being connected to said power source means and said contacts of said third relay being connected to said first relay.

8. An electrical circuit according to claim 5, wherein said current generating means includes an alternator.

9. An electrical circuit according to claim 5, wherein said power source means includes:
(a) a battery; and
(b) an openable and closeable switch connected to said battery.

* * * * *